Jan. 29, 1935. A. L. KNAPP 1,989,368
MOTOR VEHICLE
Filed April 26, 1933
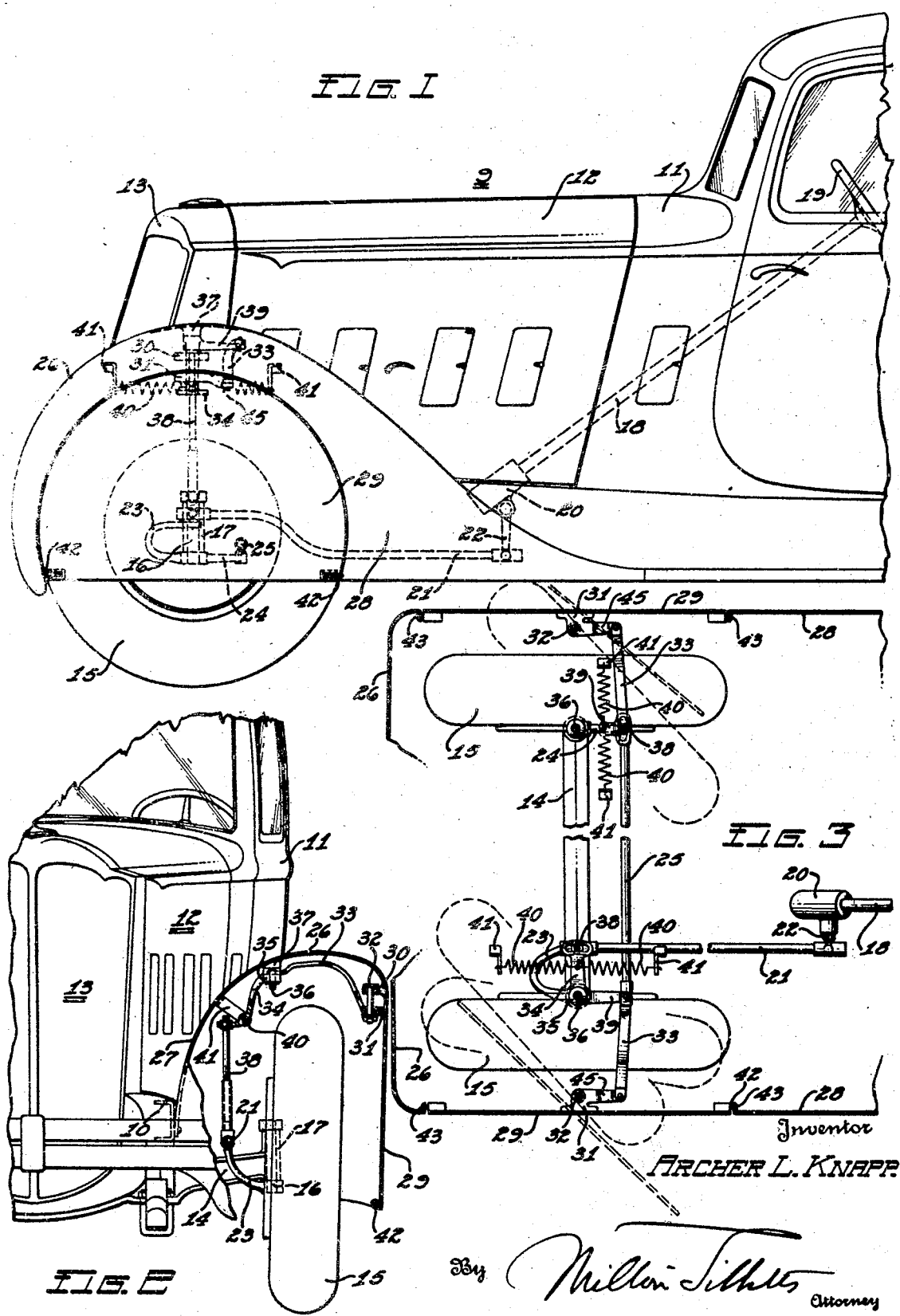

Patented Jan. 29, 1935

1,989,368

UNITED STATES PATENT OFFICE 1,989,368

MOTOR VEHICLE

Archer L. Knapp, Detroit, Mich., assignor to Packard Motor Car Company, Detroit, Mich., a corporation of Michigan Application April 26, 1933, Serial No. 667,953

6 Claims. (Cl. 280—153)

This invention relates to motor vehicles and more particularly to motor vehicle fender construction.

An object of the invention is to provide a wheel fender structure which reduces the wind resistance of the wheel and associated parts as well as reducing splashing of the vehicle by the wheel.

Another object of the invention is to provide a fender structure which closely encases the major portion of a motor vehicle steering wheel without interfering with its steering movement.

A still further object of the invention is to provide a fender apron section which is operated by the steering mechanism to turn with a vehicle steering wheel after a predetermined steering movement of the wheel beyond a straight course position.

Other objects of the invention will appear from the following description taken in connection with the drawing, which form a part of this specification, and in which:

In the drawing, Fig. 1 is a side elevational view of the front end of a motor vehicle showing my invention associated therewith;

Fig. 2 is a front elevational view of the motor vehicle having one of the fenders partly in section and partly broken away and showing a portion of the mechanism for swinging the side sections of the fenders.

Fig. 3 is a diagrammatical plan view of the wheel steering mechanism and the associated mechanism for swinging the movable side portions of the fenders;

Referring now to the drawing by characters of reference, 9 illustrates generally a conventional type of motor vehicle having a frame 10, a body 11, a motor enclosing hood 12 and a radiator 13. A front axle 14 carries a pair of front steering wheels 15 which are pivoted at the ends thereof by means of king pins 16 extending through bearings 17.

The steering mechanism for turning the front wheels is of a conventional type which includes a steering column 18 having a control wheel 19 at one end thereof and projecting into a steering gear housing 20 at the other end for operating gear mechanism (not shown). A drag link 21 extends forwardly at the side of the gear housing and is reciprocated by the gearing in the housing through means of the arm 22. The forward end of the drag link is pivotally connected to the steering arm 23 fixed to one of the king pins 16. Similar parallel arms 24 are also fixed to the king pins and project rearwardly therefrom so that the cross tie rod 25 can pivotally connect the rear ends thereof.

A fender structure is arranged at each side of the forward end of the motor vehicle for enclosing substantially the major portion of the steering wheels. The fender structures are similar and they are preferably made of sheet metal. They are bent to form an enclosure consisting of a central wall portion 26, an inside wall portion 27 fixed to the frame 10 and an outside wall apron or fairing 28. The fixed portion of the outer wall 28 of each fender is cut out to conform to the shape of the adjacent steering road wheel and a swingable apron section 29 is arranged to fit within the cut-out portion. The outer fender wall, consisting of the stationary section and the swingable section, extends substantially in a vertical plane, except where it curves into the central wall, and it projects downwardly to within a short distance above the surface on which the front wheels rest. Through the provision of the swingable apron section of the fairing, the wheel is substantially enclosed so that splashing of the exterior of the vehicle by the front wheel is materially reduced. In addition to this, the arrangement of the outer wall is such that resistance to wind normally offered by the front wheels and their associated parts is substantially eliminated.

Through the provision of the swingable apron sections, the outer wall of the fenders can be arranged in close proximity to the steering wheels because no allowance for turning movement needs to be made.

Beneath each of the front fenders is fixed a bracket 30 which aligns with a bracket 31 fixed on the aprons 29 so that pintles 32 can pass therethrough to provide a hinge connection. An arm 45 is fixed to and extends rearwardly from each bracket 31 and pivotally connected to each arm is a transversely extending link 33. Pins 36 are fixed to bosses 37 projecting beneath the fenders, and rearwardly extending arms 39 are pivotally mounted on the pins and pivotally connected with the links 33. The arm 39 at the left side of the vehicle forms part of a bell crank 35, the other arm of which is indicated at 34. A telescoping sectional rod 38 is pivotally carried by the steering arm 23 and engages the arm 34 while a similar sectional rod is pivotally mounted on the end of the cross tie rod at the right side of the vehicle and engages the adjacent arm 39. The pins 36 are arranged in axial alignment above the king pins of the steering wheels so that the apron operating mechanism will swing the aprons substantially parallel with the wheels in their steering movement. Through the provision of the telescoping rods 28, vertical movement of the steering wheels can take place without interfering with the functioning of the apron swinging mechanisms.

The arm 34 and the arm 39 on the right side of the vehicle are provided with a slotted end portion through which the upper section of the telescoping rods 38 project and operation of the steering mechanism will swing the telescoping rods 38 therewith which, in turn, will transmit motion to the levers 39 and the arms 33 to swing the aprons. The provision of the slots in the arms 34 and 39 allows a limited steering movement of the wheels away from the straight forward path before rotating the swingable apron sections, but the slots are of such length that movement of the steering wheels, when closely approaching the swingable aprons, will operate the mechanisms to swing the apron sections with the wheels. In order to normally urge the swingable apron sections into aligned relation with the fixed outer wall sections, opposed springs 40 are associated with the arm 34 and with the arm 39 at the right side of the vehicle, such springs being attached to brackets 41 suitably secured to the vehicle.

In order to assist in maintaining the swingable apron sections in closed position, suitable retaining means can be provided. In the present instance, I have shown spring pressed plungers 42 carried by the ends of the swingable apron sections which are engageable with detents 43 formed in the inturned beading surrounding the opening in the fixed outer wall of the fenders.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle, the combination of steering gear, a pair of pivotally mounted side aprons, and lost motion mechanism connecting the steering gear with the pivoted aprons.

2. In a vehicle, the combination of steering gear, a pair of pivotally mounted fender side aprons, mechanism connecting the aprons with the steering gear, said mechanism including lost motion connections, and means normally urging said mechanism into position where the lost motion must be taken up before the aprons will be turned by the steering gear.

3. In a vehicle, the combination of steering gear, a pair of pivotally mounted fender side aprons, mechanism connecting the aprons with the steering gear, said mechanism including lost motion connections, and resilient means normally urging said mechanism into position where the lost motion must be taken up before the aprons will be turned by the steering gear.

4. In a motor vehicle, the combination with wheel turning mechanism and pivoted fender side aprons, of mechanism connecting the wheel turning mechanism with the aprons comprising linkage associated with each apron, a lost motion connection between the steering gear and each linkage, and resilient means normally holding the lost motion connections in position where lost motion must be taken up before the aprons will be turned by the steering gear.

5. In a motor vehicle, the combination of steering gear, a pair of pivotally mounted fender side aprons, a linkage connected with each pivoted apron, and lost motion connections between the steering gear and the pivoted aprons, said steering gear being effective to operate the linkages simultaneously.

6. In a vehicle, the combination of a fender having side faring formed therewith, a side apron pivotally supported by the fender, steering gear means, mechanism connecting said steering gear means directly with said aprons, said mechanism turning said aprons upon their pivots through operation of the steering gear means, and means constraining said apron from pivotal movement away from aligned position with the fender faring.

ARCHER L. KNAPP.